(No Model.)
M. L. SMITH.
WHEEL FOR VEHICLES.
No. 358,631. Patented Mar. 1, 1887.
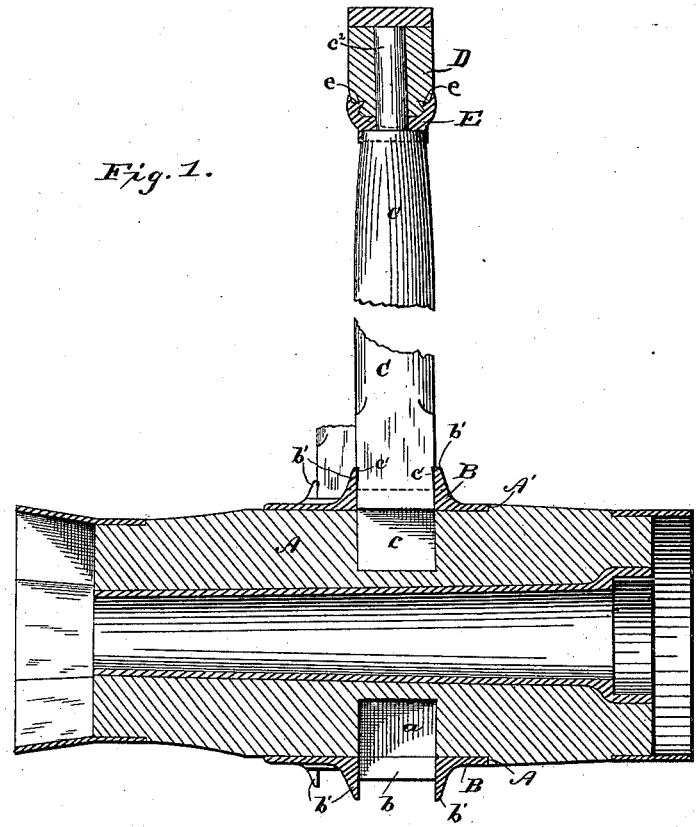
Fig. 1.
Fig. 2.
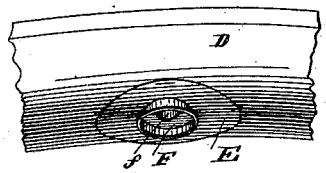
Fig. 3.
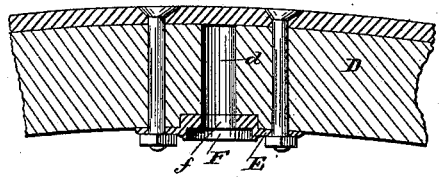
Fig. 4.
Witnesses.
Chas. R. Burr.
A. C. Rawlings.
Inventor.
Melvin L. Smith
by Franck D. Johns
his Attorney.

UNITED STATES PATENT OFFICE.

MELVIN L. SMITH, OF BATAVIA, NEW YORK.

WHEEL FOR VEHICLES.

SPECIFICATION forming part of Letters Patent No. 358,631, dated March 1, 1887.

Application filed November 8, 1886. Serial No. 218,310. (No model.)

*To all whom it may concern:*

Be it known that I, MELVIN L. SMITH, a citizen of the United States, residing at Batavia, in the county of Genesee and State of New York, have invented certain new and useful Improvements in Wheels for Vehicles; and I do hereby declare the following to be a full, clear, and exact description of the invention, such as will enable others skilled in the art to which it appertains to make and use the same.

My invention relates to improvements in wheels for vehicles; and it consists in certain novelty in the construction and arrangement of the various parts, all of which I will now proceed to point out and describe, reference being had to the accompanying drawings, in which—

Figure 1 is a longitudinal section taken through the center of the hub of a wheel embodying my invention, one spoke being attached to the hub, the clip and felly, to which the outer end of the spoke is secured being in section. Fig. 2 is a detail in perspective showing the clip secured to the felly. Fig. 3 is a perspective of the clip removed, and Fig. 4 a detail in section showing the clip secured to the joint of the sections of the felly.

Referring to said drawings, A is a wooden hub having an annular shoulder, A', and spoke sockets or mortises $a$.

B is a malleable-metal collar, which is forced or shrunk on the hub A until its inner end rests against the shoulder A'. Said collar is provided with apertures or mortises $b$, of sufficient size to receive the full size of the inner end of the spokes. When the collar is placed on the hub A, the apertures $b$ come directly over the sockets or mortises $a$. At either end of the apertures $b$ are projections $b'$.

C represents one of the spokes having a tenon, $c$, on its inner end. This tenon is inserted through the aperture $b$ into the socket or mortise $a$, the full end of the spoke fitting in the aperture $b$. When the spoke is inserted, the projections $b'$ are compressed or forced against the spoke until they enter the recesses or notches $c'$. The spoke is thus held securely in place, the projections $b'$ preventing it from being drawn out of the hub by any lateral strain upon the wheel.

D represents the felly of the wheel.

E is a clip made of malleable metal and provided on its inner and opposite sides with spurs $e$, which are driven into the felly when the clip is compressed around the same, and thus hold said clip in place.

F is a spoke-socket formed in the clip, and is large enough to receive the full body or thickness of the end of the spoke. In the center of the bottom of this socket is an aperture, $f$, of sufficient size to permit the tenon $c^2$ on the outer end of the spoke to pass through said aperture and fit in the socket $d$ in the felly, said socket $d$ being just large enough to receive the tenon $c^2$. The spoke is materially strengthened by having the end which enters the socket in the clip full size, and the felly is in no way weakened, as only the tenon on the end of the spoke enters said felly. The spurs on the clip hold the same securely in place, and when it is desired to remove a spoke it can be done without disturbing the clip. The clip, at the joints of the felly-sections, is provided with two bolts, as shown in Fig. 4. The socket for the tenon on the end of spoke is formed between the meeting ends of the felly-section, and when said tenon is inserted it prevents any chance of lateral displacement of the section at the joint.

I am aware that wheels have been constructed with metal collars surrounding the wooden hubs and having apertures in said collars to receive the inner ends of the spokes, said apertures being provided with projections or lips, which form extensions of the walls of the apertures. This construction I do not claim, broadly; but What I do claim as new, and desire to secure by Letters Patent, is—

The wooden hub A, having the spoke-sockets $a$, and the malleable-metal collar B, surrounding the hub A and having apertures $b$ over the spoke-sockets, and provided with projections $b'$ at each end of said apertures, in combination with the spokes C, having their inner ends inserted in the apertures $b$ and provided with tenons $c$, passing through the apertures $b$ and fitting in the sockets $a$ and recesses $c'$, and having the projections $b'$ compressed or clamped against the spokes C into the recesses $c'$, substantially as shown and described.

In testimony whereof I affix my signature in presence of two witnesses.

MELVIN L. SMITH.

Witnesses:
   JAMES FOX,
   D. L. DODGSON.